(12) United States Patent
Roffman et al.

(10) Patent No.: US 7,311,829 B2
(45) Date of Patent: Dec. 25, 2007

(54) WATER CONVERSION DEVICE

(75) Inventors: Ehud Roffman, Herzelia (IL); Haim Wilder, Raanana (IL); Baruch Berliner, Ra'anana (IL)

(73) Assignee: H2Q Water Industries, Ltd., Ramat Gan (IL)

( * ) Notice: Subject to any disclaimer, the term of this patent is extended or adjusted under 35 U.S.C. 154(b) by 132 days.

(21) Appl. No.: 10/545,506

(22) PCT Filed: Feb. 11, 2004

(86) PCT No.: PCT/GB2004/000499

§ 371 (c)(1),
(2), (4) Date: Aug. 12, 2005

(87) PCT Pub. No.: WO2004/071961

PCT Pub. Date: Aug. 26, 2004

(65) Prior Publication Data

US 2006/0096925 A1     May 11, 2006

(51) Int. Cl.
    *B01D 24/00* (2006.01)
(52) U.S. Cl. .................. 210/265; 210/266; 210/681; 210/686
(58) Field of Classification Search ........ 210/265–266, 210/681, 686
See application file for complete search history.

(56) References Cited

U.S. PATENT DOCUMENTS

| | | | |
|---|---|---|---|
| 417,070 A | 12/1889 | Morris | |
| 789,968 A | 5/1905 | Ernst | |
| 1,090,283 A | 3/1914 | Crandall | |
| 2,163,829 A | 6/1939 | Chilton | |
| 3,327,859 A * | 6/1967 | Pall | 210/266 |
| 3,635,818 A | 1/1972 | Muzzarelli, Nee Weckx | |
| 4,828,698 A * | 5/1989 | Jewell et al. | 210/266 |
| 5,011,824 A | 4/1991 | Masada et al. | |
| 5,479,907 A | 1/1996 | Walker | |
| 5,628,895 A | 5/1997 | Zucholl | |
| 2003/0012714 A1 | 1/2003 | Taylor | |

FOREIGN PATENT DOCUMENTS

| | | |
|---|---|---|
| DE | 3535679 A1 | 5/1987 |
| FR | 2 784 092 | 4/2000 |
| RU | 2163829 | 10/2001 |
| WO | WO 90/02708 A | 3/1990 |
| WO | WO 00/22688 | 4/2000 |

\* cited by examiner

*Primary Examiner*—Chester T. Barry
(74) *Attorney, Agent, or Firm*—RatnerPrestia

(57) ABSTRACT

A water treatment device and method for treating a quantity of water is powered by gravitational flow. The device includes an upper collecting chamber (14) and a filtration chamber (18). The filtration chamber includes a set of reactance containg at least three components wherein one of the components is a polycation and another one of the components is a polyanion. The method includes subjecting the water to gravitational flow through the filtration chamber (18).

18 Claims, 9 Drawing Sheets

WATER CONVERSION DEVICE

TECHNICAL FIELD OF THE INVENTION

The present invention relates to the general field of water treatment systems. More specifically, the present invention is in the field of systems used for converting raw or partially treated water, into human—consumable water.

BACKGROUND OF THE INVENTION

Raw water is oftentimes found to be in a quality level unacceptable as judged by health standards, on account of its undesirable contents such as toxic matter, pathogens and radioactive nuclides. In addition, such raw water may contain matter which can render it unsatisfactory with regard to palatability or appeal to the eye. Treatment measures to ameliorate water are usually applied by state, municipal authority, or by the individual consumer. These treatment measures typically include chemical, physical, and biological procedures that aim at eliminating undesirable suspended and dissolved matter. In U.S. Pat. No. 5,543,056 is disclosed a method for removing colour and particles, from drinking water by the use of chitosan in combination with a clay mineral. Chitosan is a derivative of chitin which is a natural polymer consisting of chains of acetylated glucosamine, usually extracted from shells of marine crustaceans. Chitosan is a fully or partially deacetylated chitin, wherein the naturally occurring amido bonds are hydrolyzed, leaving the amino groups of the polymer exposed and active.

Despite municipal or state treatment measures, resultant water is often not considered a reliable source for drinking water. Thus, concerned consumers opt for purchased canned or bottled water in order to ensure reasonable quality drinking water. However, bottled water are relatively expensive and may contain industrial contaminants derived from the walls of the container, in addition to the original natural impurities.

Several types of domestic water treatment systems are known in the art. Some rely on directly applied external energy for treating the water, for example distillation devices and ultraviolet irradiators. Other systems employ physical and or chemical processes that do not consume direct external energy. Among these some employ ion exchangers for eliminating ions such as calcium and other metal ions, and others employ activated carbon for mainly eliminating organic matter, dissolved gases and toxic materials; nevertheless some systems employ both ion exchangers and activated carbon. U.S. Pat. No. 4,717,476 discloses an apparatus for purifying water that employs a sequence of purification steps, each step accomplishes a different aspect of purification in a separate unit such that in the final step a desired product is obtained. U.S. Pat. No. 4,749,481 discloses a device and method for upgrading water quality for household use by using small, disposable disc-like elements that contain active material. These discs can be used in stacks thus performing successive steps of water treatment, each by a different disc element in the stack.

Home appliances for ameliorating consumer water are available in the market, that require connection to the home inlet, thus benefiting from the pressurized water supply provided by the local authorities. The pressure is used to drive the water through one or more cartridges that contain ion exchangers, and or activated carbon. Manufacturers of such devices recommend replacement of cartridges on a regular basis as well as other components of these systems that deteriorate in time. Other home appliances which do not require connection to the home plumbing, are pour—through water pitchers, typically containing cation exchange resins and activated carbon granules in their filters. Such filters often contain silver for preventing the build up of bacterial colonies, and generally require regular replacement. Some home water purifying systems contain easily replaceable parts so as to allow easy maintenance by the owner. In U.S. Pat. No. 5,989,424 the replaceable component is a filter cartridge.

DETAILED DESCRIPTION OF THE PRESENT INVENTION

Figure 1:
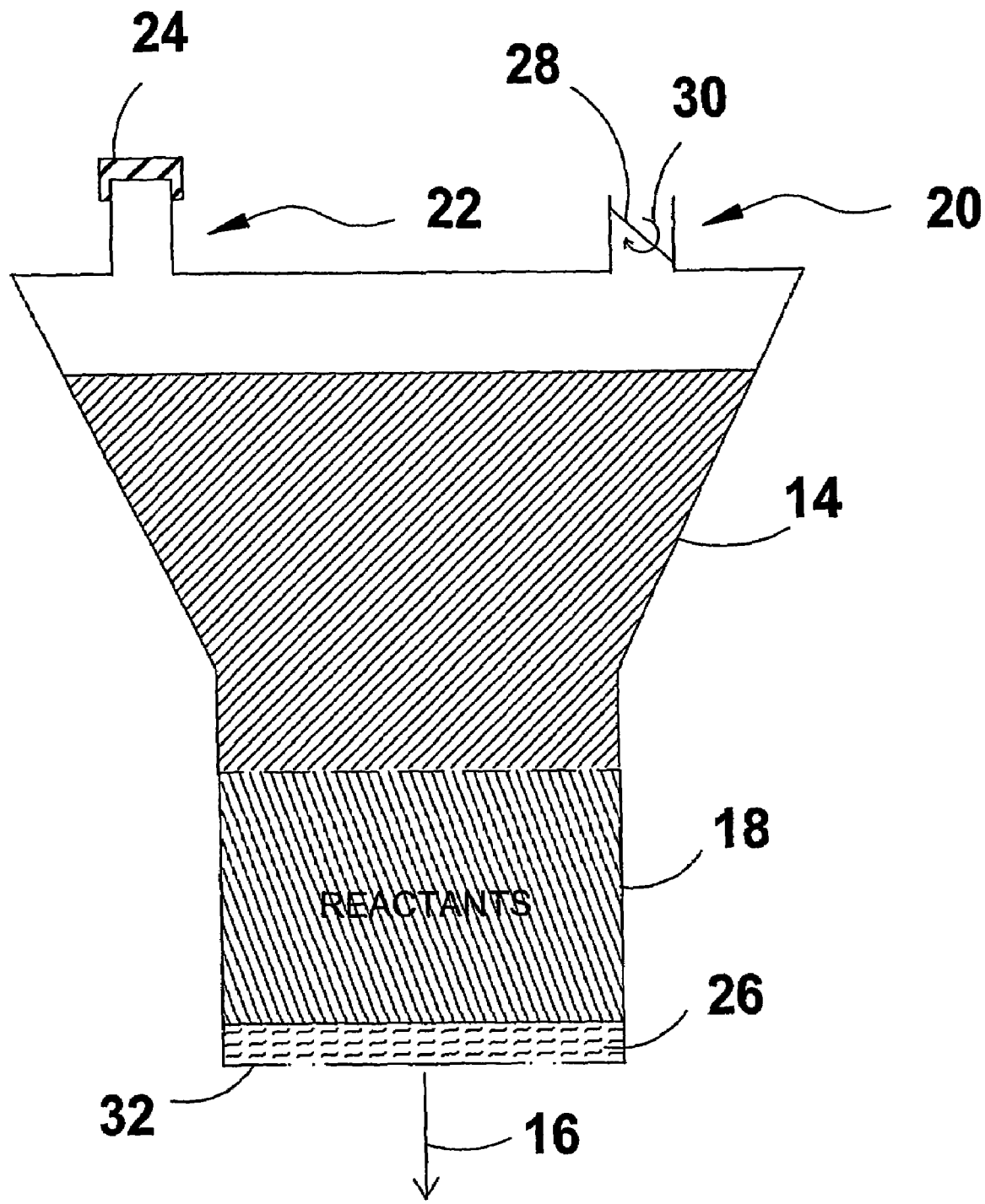
FIG. 1 is a schematic longitudinal section in a water conversion device according to an embodiment of the present invention, describing its main structural features.

A system manufactured in accordance with the present invention, supplies water for human consumption, such that available water is converted by the system into higher grade water as will be explained in the following description. Reference is now made to FIG. 1, which describes schematically the main structural features of an embodiment of a water conversion device made in accordance with the invention. An upper collecting chamber 14, is filled with municipal water which flow, driven by the force of gravity, in the direction of arrow 16. In the filtration chamber 18, a set of reactants perform conversion of the municipal water flowing through them. On the top side of the collecting chamber 14 are fitted a valve 20 a water inlet 22. The water inlet 22 is fitted with a stopper 24 on top. Beneath the reactants in the filtration chamber 18, a permeable mesh or a sieve 26 is installed, on which the reactants are settled, allowing water to flow through, but keeping the reactants in the filtration chamber 18.

Functionally, source water, either raw or municipally treated, passing through the filtration chamber is altered as it interacts with a set of solid reactants disposed within the chamber. There exists a relationship between the length of time that the water flows through the set of reactants contained within the filtration chamber, and the final results obtained as regards water quality. Typically, the longer the water is allowed to interact with the reactants, the more effective the conversion is. Accordingly, in one embodiment of the invention, the length of time that the water is allowed to interact with the reactants is accounted for by the opening status of valve 20. Valve 20 is opened by the turning of stopper 28, in the direction of arrow 30. Valve 20 is opened in the course of filling water serving as a vent in the collection chamber. It is also used for controlling the flow rate once the water is made to percolate through the filtration chamber. As regards percolation, a fully opened valve 20, allows maximal flow rate to take place, whereas a closed position prevents water flow altogether. Intermediate opening states, permit intermediate flow rates respectively. In other embodiments of the invention, a valve may be absent, with a breather taking its place to allow water into the collecting chamber 14, and percolation of water through the filtration chamber 18.

In a preferred embodiment of the invention, the set of reactants contain three different components, disposed within the filtration chamber. The water percolating down the chamber passes through and reacts with components of the set of reactants. In a preferred embodiment of the instant invention, the reactants belong respectively to three categories, as follows: A. A weak acid cation exchanger made of an anionic polymer, typically having carboxylic groups as the functional group, B. Activated carbon, and C. A weak base anion exchanger, made of a catonic polymer. The three components act each by its own virtue to modify the incoming water such that the resulting water can be considered as being of higher quality and or of better potability. Within the filtration chamber, the reactants may be arranged fully mixed to partially mixed, or layered in one or more separate layers. The polyanionic component is typically granulated, containing pores, and the activated carbon is likewise, typically granulated. The polycation is employed in the physical form of granules, and may also be used in the form of flakes.

Figure 2A:
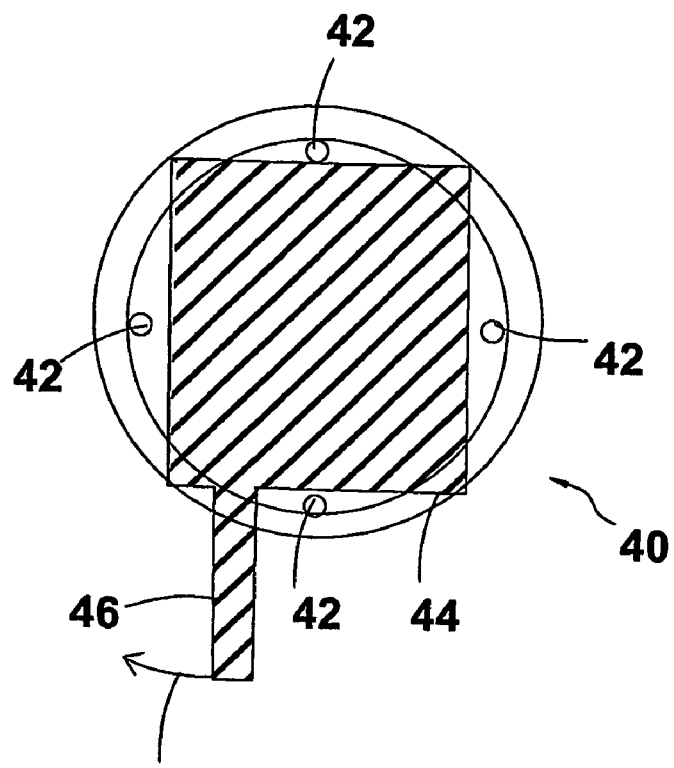
FIG. 2A is a schematic illustration of the open pores in the bottom of a filtration chamber of a device of the invention.
Figure 2B:
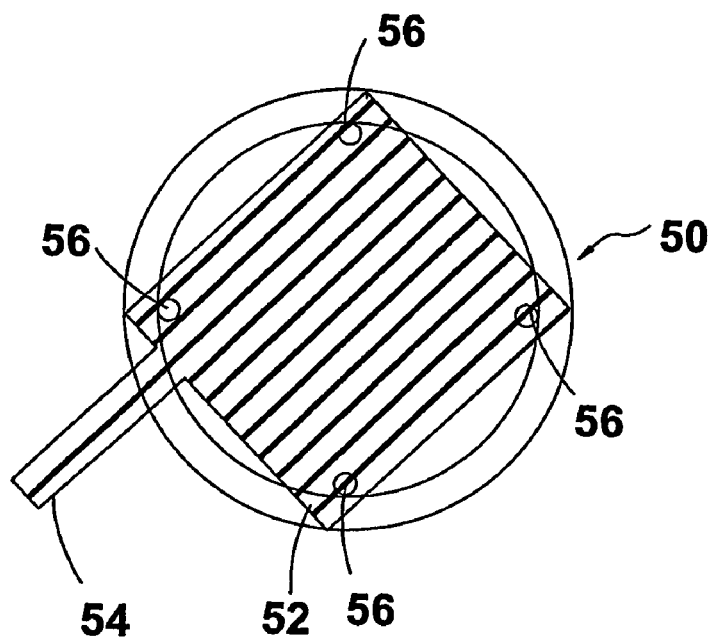
FIG. 2B is a schematic illustration of the bottom of a filtration chamber of a device of the invention, in which the pores are occluded.

Control over the rate of flow of water is not necessarily achieved by valve opening. In some embodiments there may not be any flow rate control at all, whereas in other embodiments, rate control may be achieved by a closure mechanism that can shut off or open the pores in the lower wall 32 of filtration chamber 18, or any other pores through which the water pass within the device of the invention. Such control is exemplified in FIG. 2A to which reference is now made. A bottom side view of a filtration chamber 40 is shown, in which the pores 42 within the bottom wall of the chamber are shown clear, allowing water to flow through. A closure plate 44 is centered pivotally over the bottom wall, with its handle 46 movable in the direction of arrow 48. In FIG. 2B to which reference is now made, a similar filtration chamber 50 is shown, with closure plate 52 rotated around a central pivot (not shown), its handle 54 turned over to the left. In this case all the pores 56 are occluded.

Figure 3:
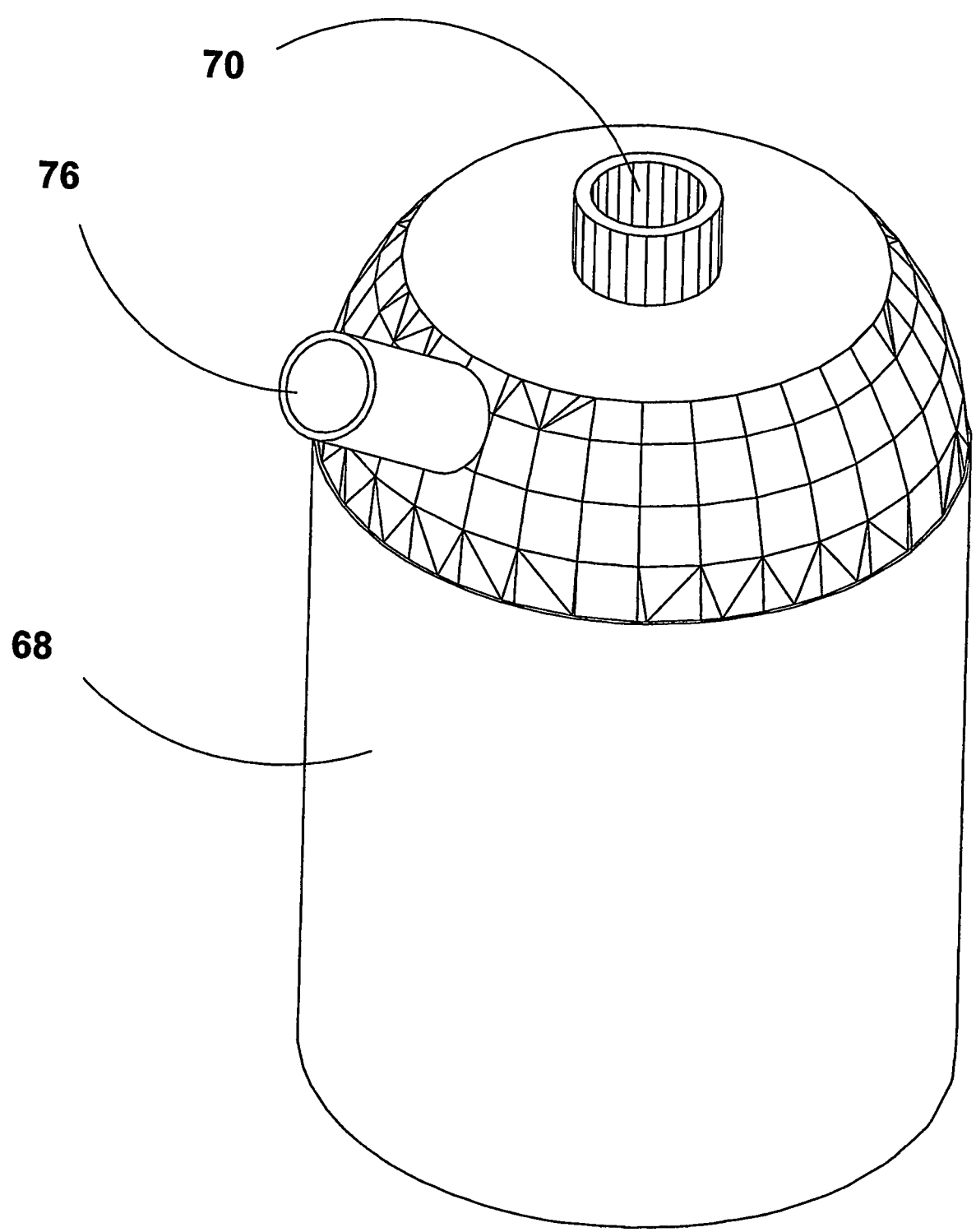
FIG. 3 is an isometric external view of a device of the invention.
Figure 4:
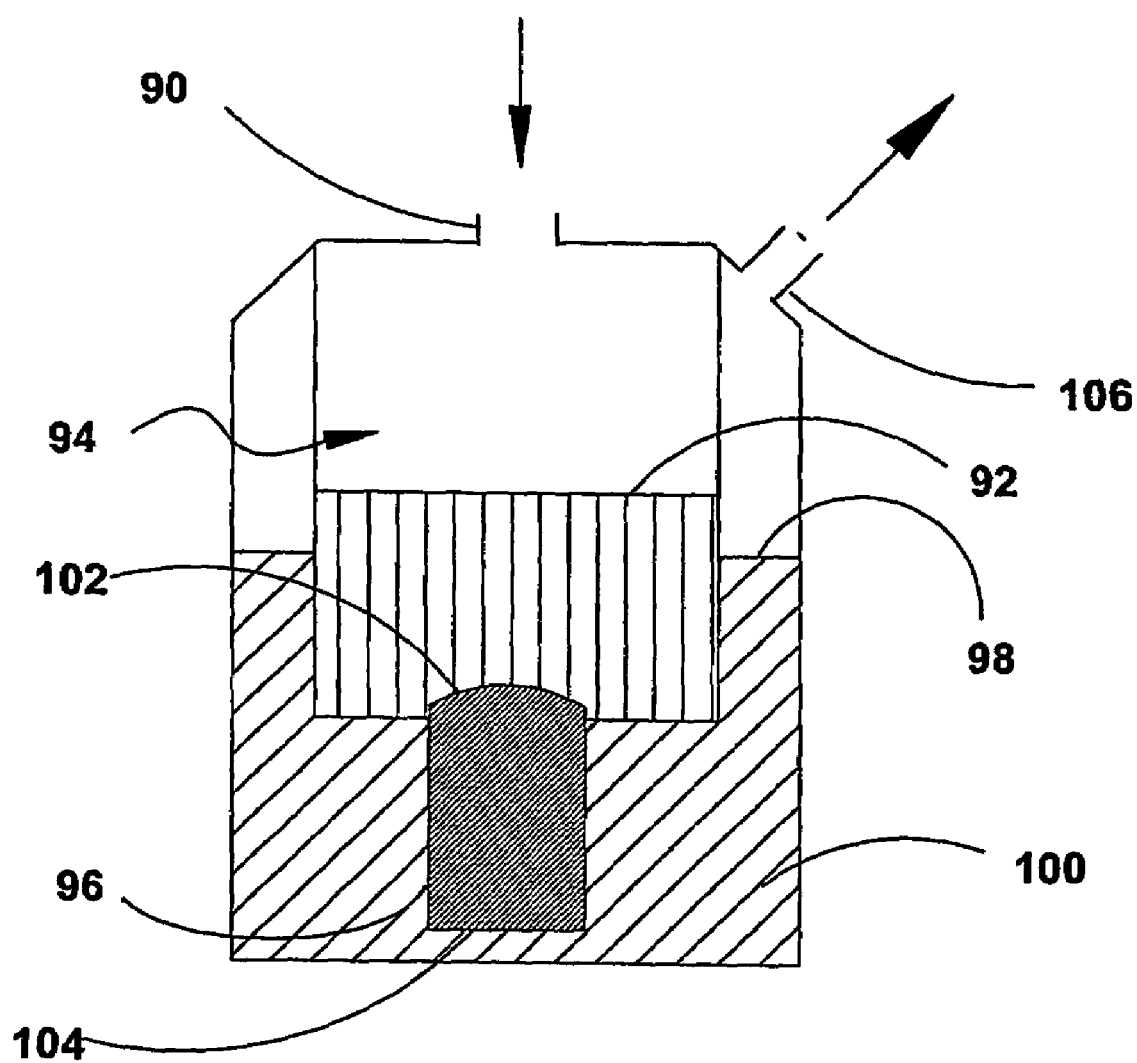
FIG. 4 is a schematic cross sectional view of a device of the invention, showing the various compartments.

In FIG. 3 to which reference is now made, an embodiment of a device of the invention is described externally, in which a portable container 68 includes several separate compartments for accomplishing the task of water treatment. Water is poured into the water inlet 70, to fill an inner compartment. Filtration chamber (not shown) is disposed within the lower part of the container 68 and is perforated at its lower side. A water outlet 76 is an orifice through which the treated water is poured outside for subsequent use. To help explain the functionality of the presently described embodiment, reference is now made to a cross sectional view of such a system illustrated in FIG. 4. Source water is poured through inlet 90, to subsequently fill to level 92 the inner compartment 94 which is a collecting chamber. Water then percolates through filtration chamber 96 and collects, reaching momentarily level 98 at outer compartment 100. The upper part 102 of filtration chamber 96 is water-permeable so that water can infiltrate into the filtration chamber. Likewise, the lower face 104 of the percolation chamber 96 is permeable to water. Last, water outlet 106 allows water to be poured out for subsequent use. In order to control the rate of water flow, a perforated cap can be plugged on the water inlet 90. The perforation serves as an air passage constraint from the outside to the collecting chamber. Constraining the air passage to the collecting chamber, such as by turning the cap, to occlude the pores, changes the size of the perforation, which results in a corresponding change in the rate of air flow entering the inner compartment. The same can be accomplished by varying perforation on a cap plugged on the water outlet.

Reference is again made to FIG. 1 in order to explain the functionality of an embodiment of the invention. Water is first filled in the upper collecting vessel 14. When allowed to flow gravitationally in direction of the arrow 16, the water subsequently pass through the filtration chamber 18, reacting with the reactants. It may be necessary to saturate or otherwise precondition the reactants before actual conversion of water may take place. Accordingly, the collecting chamber 14 is filled with water for a predetermined period of time, typically between ten to forty minutes in order to prepare the column. In that period, water fills the voids between and inside the particles which constitute the reactive components. Temporarily withholding the water in the device may be needed for other reasons such as for storing the device between uses. In addition, temporary retention of water in the collecting chamber can take place during which time agents, typically iodine, are activated whereby killing of pathogens is achieved within the collecting chamber. Later, when the disinfected water percolates down the set reactants, the iodine is eliminated within the activated carbon.

As the weak base polymer, the biological polymer chitosan is preferably used with the extra advantages of being naturally degradable as well as having anti microbial traits. Being a polymer composed of monomers containing each a weak base, this component can scavenge hydrogen cations. It therefore counteracts the buffering action of the weak acid buffer activity associated with the polyanion.

In accordance with a preferred embodiment of the invention all the components composing the reactants of the device are environmentally degradable such that safely disposable devices can be fabricated.

Extending Water Interaction with the Reactants

Figure 5:
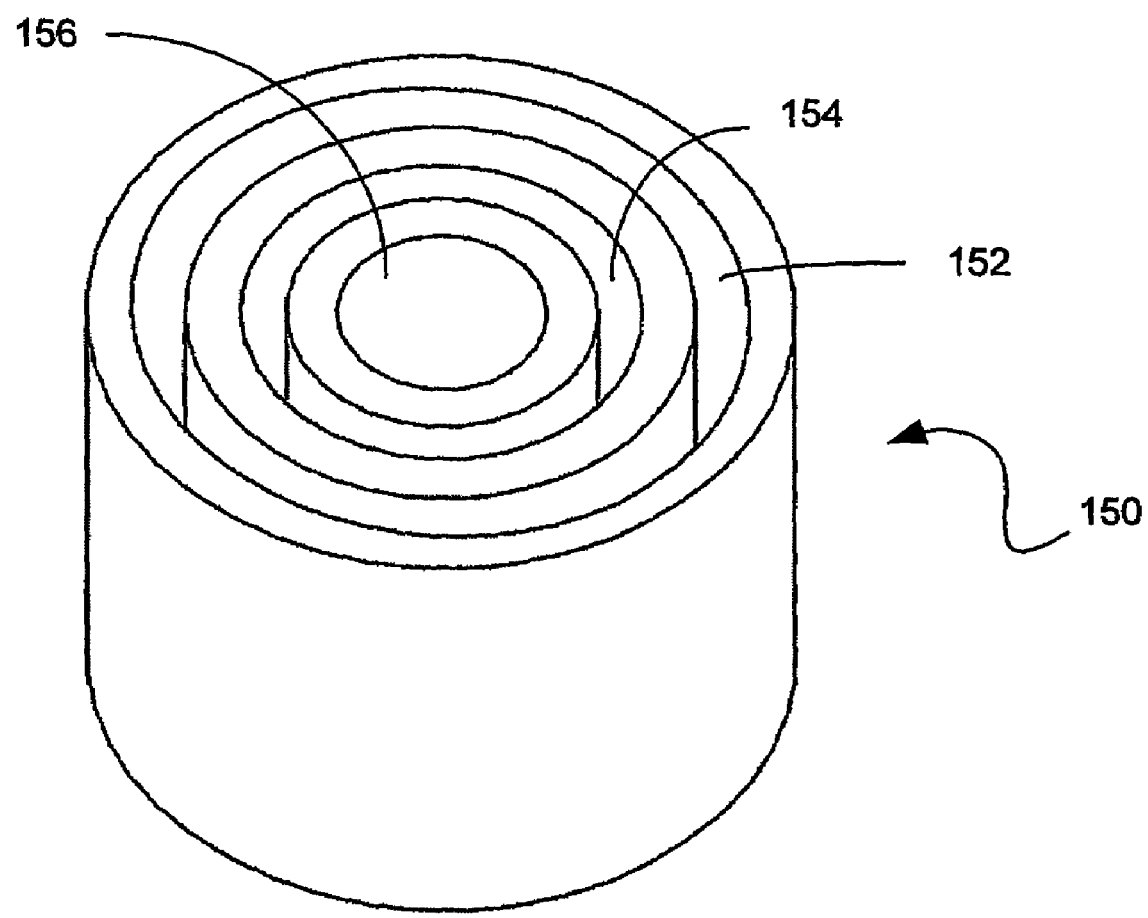
FIG. 5 is a schematic description of a lower shell of a filter of an embodiment of the invention.
Figure 6A:
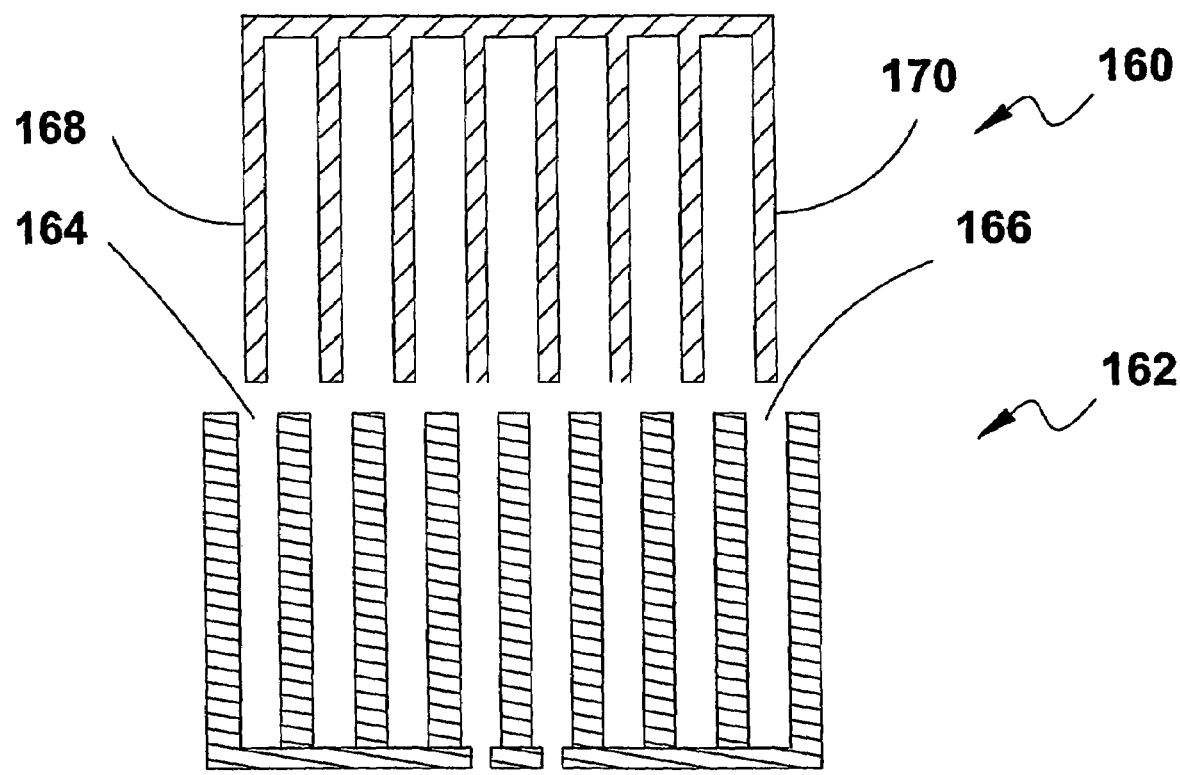
FIG. 6A is a schematic description of a lower shell and upper shells of a filter of the invention in matching position.
Figure 6B:
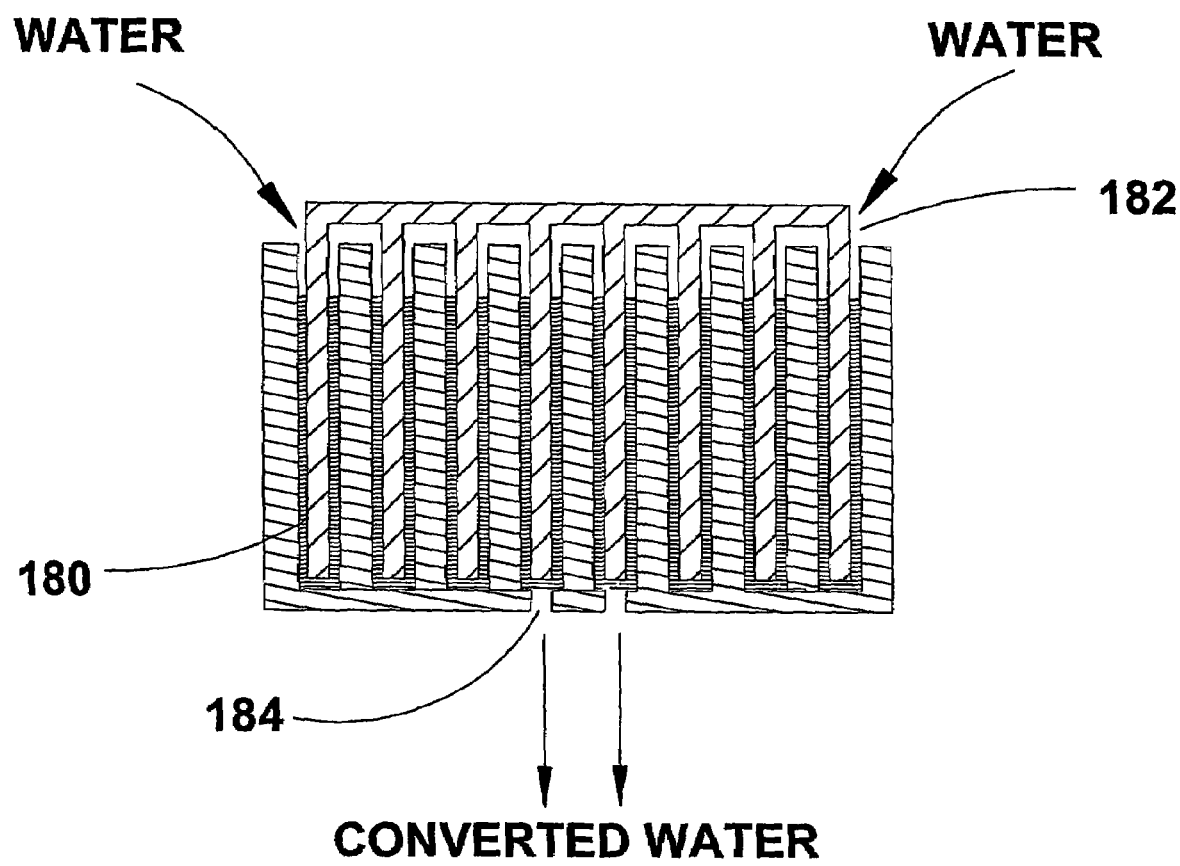
FIG. 6B is schematic description of the functional aspects of a serpentine filter of the invention.

In order to increase the interaction of the water undergoing conversion, a filter element is provided that forces the water to follow a serpentine route in association with the reactants. The filter element in such an embodiment is composed of a lower and an upper shells in a structured combination as will be described later on. To explain this, reference is made to FIG. 5, which shows the bottom shell 150 of the filter element. Circular crevices 152, 154 and 156 are shown. These crevices are filled with reactants in accordance with the invention. A matching shell is then superimposed on the bottom shell as is described in FIGS. 6A and 6B to which reference is now made. In FIG. 6A, a cross sectional view of the matching upper 160 and lower 162 shells is shown. Crevices such as crevice 164 and 166 are matched by ridges 168 and 170 respectively. The ridges of the upper shell are intercalated in the crevices of the lower shell. Before the shells are combined, the reactants are filled in the crevices of the lower shell. This can be seen in FIG. 6B, in which filling 180 designates the reactants occupying the spaces between the crevices and the ridges. Functionally, water penetrates into the filter through the opening 182 to follow a serpentine route, eventually to exit through outlet openings such as opening 184. Once coming into contact with water, the reactants are to be kept moist throughout the effective life of the system, for the reason that if the reactants run dry, they may crack and shrink preventing effective filtration. The serpentine filter supports a permanent humid environment. This relates to the fact that even when the consumer uses all the available water, some residual amount of water nevertheless accumulates in the serpentine crevices and diffuses through the reactants.

Figure 7:
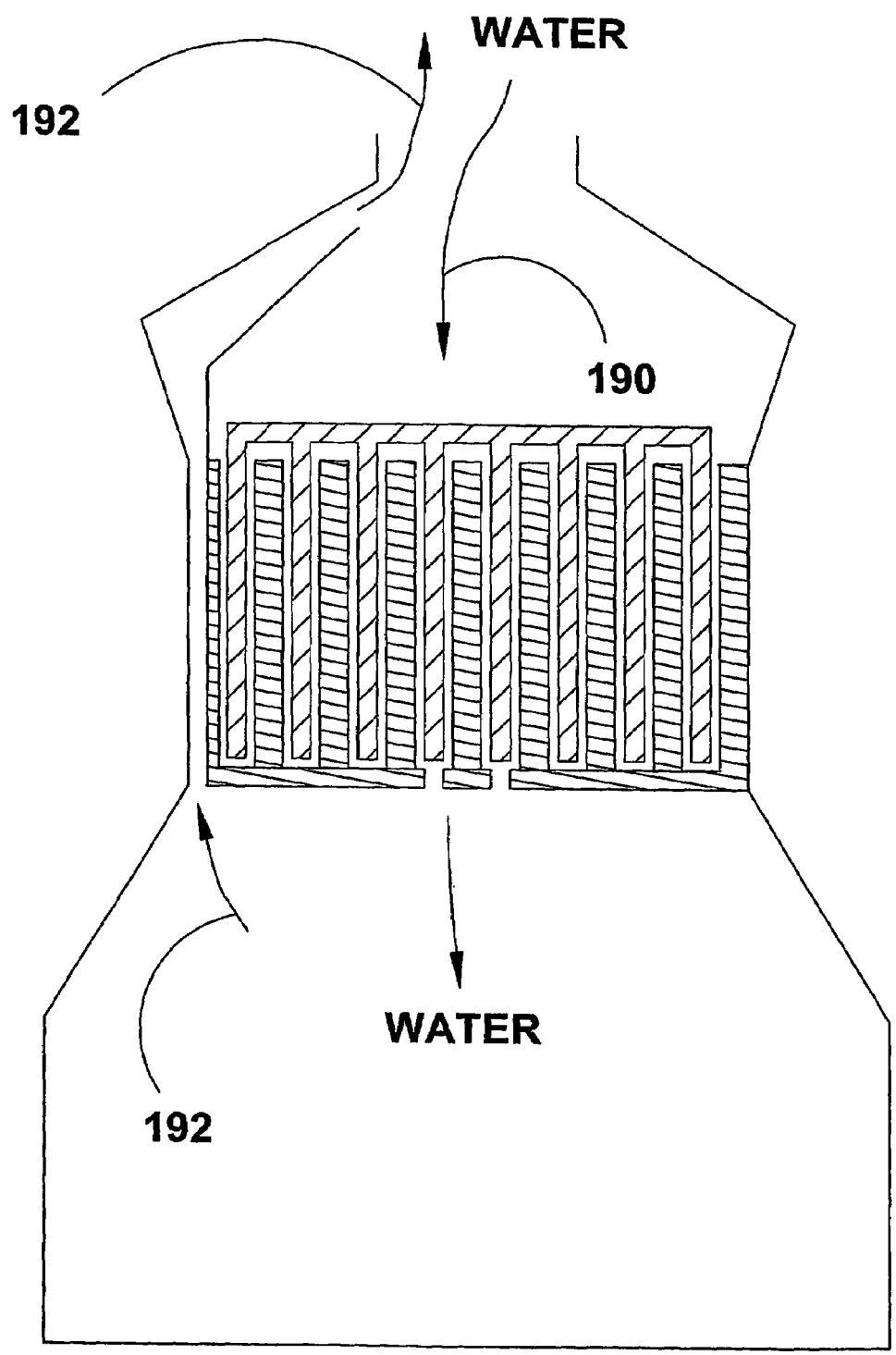
FIG. 7 is a cross sectional view of a bottle of the invention containing a serpentine filter.

In FIG. 7, a filter of the invention is shown configured in a bottle that contains separate spaces for source water and for treated water. Source water is poured through the upper access in the direction of arrow 190. Air is pushed out in the direction of arrows 192, to be replaced by treated water. Later, treated water can be poured out in the direction of arrows 192.

A Compact Embodiment

Figures 8A, 8B:
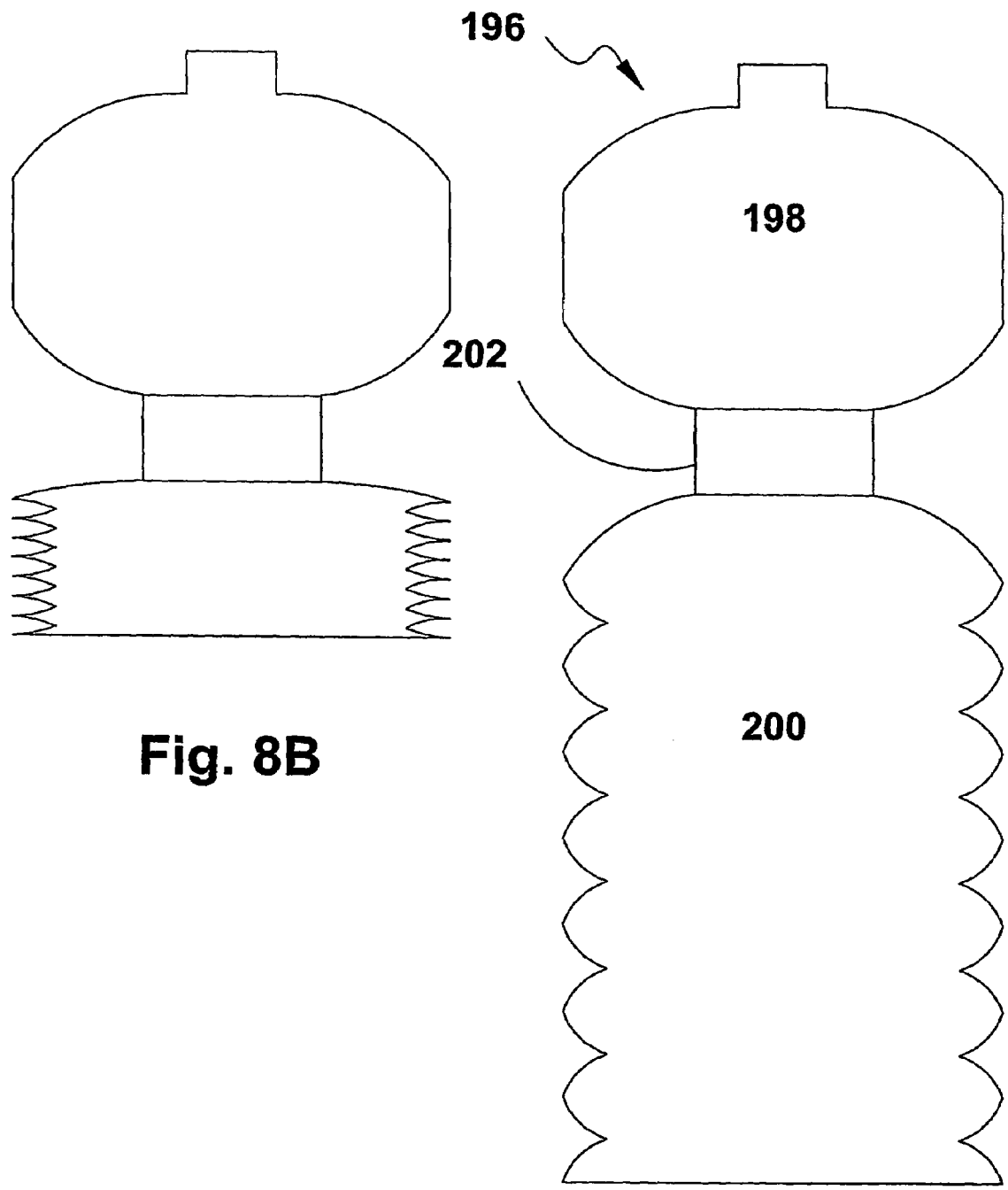
FIG. 8A is a schematic description of a compact bottle of the invention in distended configuration.
FIG. 8B is a schematic description of a compact bottle of the invention in contracted configuration.

In FIGS. 8A and 8B a compact embodiment is described which permits convenient usage of the device of the invention. Bottle 196 is composed of an upper compartment 198 and a lower compartment 200. In between filter 202 is disposed. In FIG. 8B the bottle is shown compressed and thus can be conveniently carried about. The compact configuration is stable and force is required to distend the lower compartment to form the full size bottle, which is also a stable configuration. In another embodiment, the upper compartment is also contractible.

Durability of a Device of the Invention

Generally, the devices of the invention are free of maintenance for their entire lifetime. The set of reactants of the device remains active as long as its functionality is not impaired. Thus clogging of physical passage routes within the filtration chamber, and depletion of adsorptive area on the reactants, activated carbon and ion exchange elements, are functionality limiting events in the life span of a device of the invention. Devices can be designed for longer effective lifespan, if the quantity of active elements is increased.

A design approach counter to increasing the functional duration of a device according to the invention, is such that would limit the life expectancy of a device of the invention to a period as short as a day. For example, a device enough to fulfill a day's need of an individual in consumption of beverages, thus favoring disposal of such a device in the end of each day. Such a short lived device requires less filtration material and accounts for less weight.

A device according to a preferred embodiment the Invention is lightweight, which is not only favorable with respect to usage such as by children or by elderly people, but it also contributes to its durability, as for example in case of impact caused by dropping. In another embodiment of the invention the device is not portable and is used as a stationary apparatus for supplying potable water on a larger scale. In such an implementation, source water can be delivered to the collecting chamber by a municipal water supply pressure.

The invention claimed is:

1. A water filter for gravitationally filtering water from an upper collecting chamber above the filter into a filtered water lower collecting chamber below the filter, the filter comprising:
   an upper shell having circular ridges; and
   a lower shell having circular crevices containing water treatment reactants, the lower shell having one or more water outlets in a bottom portion of the shell, wherein said upper shell is superimposed upon and matched with said lower shell, thereby forming a filter element with a circular water inlet at a top side thereof and defining a serpentine water flow path from said inlet to the one or more water outlets at a bottom side thereof.

2. The filter of claim 1, wherein the upper shell circular ridges extend into spaces formed by the lower shell circular crevices.

3. The filter of claim 2, wherein the circular water inlet is located along a periphery of the top side of the filter and the one or more water outlets are located in a central part of a bottom side of the filter.

4. The filter of claim 3, wherein the upper shell circular ridges and the lower shell circular crevices are concentric.

5. The filter of claim 1, wherein the water treatment reactants are configured to convert source water into potable water.

6. A potable water container comprising the filter of claim 5.

7. A potable water container, comprising:
   a potable water reservoir with a sealable dispensing outlet;
   the filter of claim 5, fitted within a lower part of the water container such that the water outlet of said filter opens into the potable water reservoir; and
   a water receptacle for introducing source water and feeding it to the filter.

8. The potable water container of claim 7 having a water filtering position in which the source water can be introduced into the water receptacle, the introduced water can then filter through said filter for conversion into potable water, and the potable water can accumulate in the reservoir.

9. The potable water container of claim 8, wherein the container is portable.

10. The portable potable water container of claim 9, further comprising an air vent for venting the reservoir while filtering.

11. The portable potable water container of claim 9, wherein said potable water reservoir has a compressed state in which the reservoir is compacted adjacent said top side and an extended state in which the reservoir is expanded.

12. A water filter for gravitationally filtering water, the filter comprising:
   an upper shell having a plurality of ridges; and
   a lower shell having a plurality of crevices containing water treatment reactants and having one or more water outlets at a bottom portion of the shell;
   said upper shell superimposed upon and matched with said lower shell such that said ridges at least partially extend into said crevices to form a filter element having a water inlet on a top side thereof, one or more water outlets on a bottom side thereof, and a serpentine water flow path through said water treatment reactants along said plurality of ridges and crevices from said inlet to said one or more outlets.

13. The filter of claim 12, wherein the inlet is located along a periphery of the top side of the filter and the one or more water outlets are centrally located in the bottom side of thefilter.

14. The filter of claim 12, wherein the ridges, crevices, and water inlet are circular.

15. The filter of claim 14, wherein the ridges and crevices are concentric.

16. The filter of claim 12 further comprising an upper collecting chamber above the filter for receiving source water and a lower collecting chamber below the filter for receiving potable water.

17. A portable water container comprising the filter of claim 16.

18. The portable water container of claim 17, wherein at least one of the lower collecting chambers or the upper collecting chamber are collapsible.

* * * * *

UNITED STATES PATENT AND TRADEMARK OFFICE
CERTIFICATE OF CORRECTION

PATENT NO.        : 7,311,829 B2  
APPLICATION NO.   : 10/545506  
DATED             : April 18, 2008  
INVENTOR(S)       : Ehud Roffman, Haim Wilder and Baruch Berliner Page 1 of 1

It is certified that error appears in the above-identified patent and that said Letters Patent is hereby corrected as shown below:

Title page insert

Related U.S. Application Data

(60) Provisional Application No. 60/446,991, filed on February 13, 2003

Signed and Sealed this

First Day of July, 2008

JON W. DUDAS  
*Director of the United States Patent and Trademark Office*

UNITED STATES PATENT AND TRADEMARK OFFICE
CERTIFICATE OF CORRECTION

PATENT NO.        : 7,311,829 B2                                            Page 1 of 1
APPLICATION NO.   : 10/545506
DATED             : December 25, 2007
INVENTOR(S)       : Ehud Roffman, Haim Wilder and Baruch Berliner It is certified that error appears in the above-identified patent and that said Letters Patent is hereby corrected as shown below:

Title page insert

Related U.S. Application Data

(60) Provisional Application No. 60/446,991, filed on February 13, 2003

This certificate supersedes the Certificate of Correction issued July 1, 2008.

Signed and Sealed this

Twenty-second Day of July, 2008

JON W. DUDAS
*Director of the United States Patent and Trademark Office*